William E. Warren
INVENTOR

BY
Lawrence E. Laubscher
ATTORNEY

March 10, 1970  W. E. WARREN  3,499,584
VALVES FOR PRESSURIZED DISPENSERS
Filed Dec. 21, 1967  2 Sheets-Sheet 2

William E. Warren
INVENTOR

BY
Lawrence E. Laubscher
ATTORNEY

United States Patent Office 3,499,584
Patented Mar. 10, 1970

3,499,584
VALVES FOR PRESSURIZED DISPENSERS
William Edward Warren, Cuffley, England, assignor to Bespak Industries Limited
Filed Dec. 21, 1967, Ser. No. 692,401
Claims priority, application Great Britain, Dec. 21, 1966, 57,287/66
Int. Cl. B65d *83/14*
U.S. Cl. 222—402.2                3 Claims

ABSTRACT OF THE DISCLOSURE

The invention relates to metering type aerosol valves, and is primarily directed to eliminating variations in the size of dose delivered due to chemical attack and other deterioration of the valve seals. The seals at opposite ends of the usual metering chamber are dimensioned and arranged to be equally exposed to chemical attack and mechanical stress. Further, the usual valve return spring is preferably situated outside the metering chamber to eliminate variations due to spring volume tolerances. Another feature resides in holding at least the top seal in an inwardly dished condition, to nullify the tendency to inward dishing which arises in use of the valve.

---

This invention relates to valves for pressurized dispensers of the type now commonly known as "aerosol" dispensers, and more particularly with aerosol valves of the type which dispense a metered dose at each operation thereof.

In accordance with a feature of the present invention which is described below, the seals at the top and bottom (i.e. outer and inner ends) of a metering chamber are so dimensioned and arranged that they will be substantially equally affected by attack from the material to be dispensed, with a view to minimizing variations in the size of the metered quantity due to changes in the flexibility and hardness of the seals brought about by the material in the dispenser. Preferably the usual valve return spring is located outside the metering chamber, for for two main reasons: first, to eliminate variations from the designed volume of the metering chamber due to variations in spring volume from one valve to another, and secondly, to avoid direct spring loading upon the surfaces of the metering chamber and so obviate variations in chamber volume due to "creep" of the materials of which the valve components are manufactured.

In another embodiment of the invention the upper (outer seal) of a metering valve is formed as a plane annulus of elastomeric material and is held in an inwardly dished condition to reduce or eliminate any further tendency to dish in operation of the valve.

Figure 1:
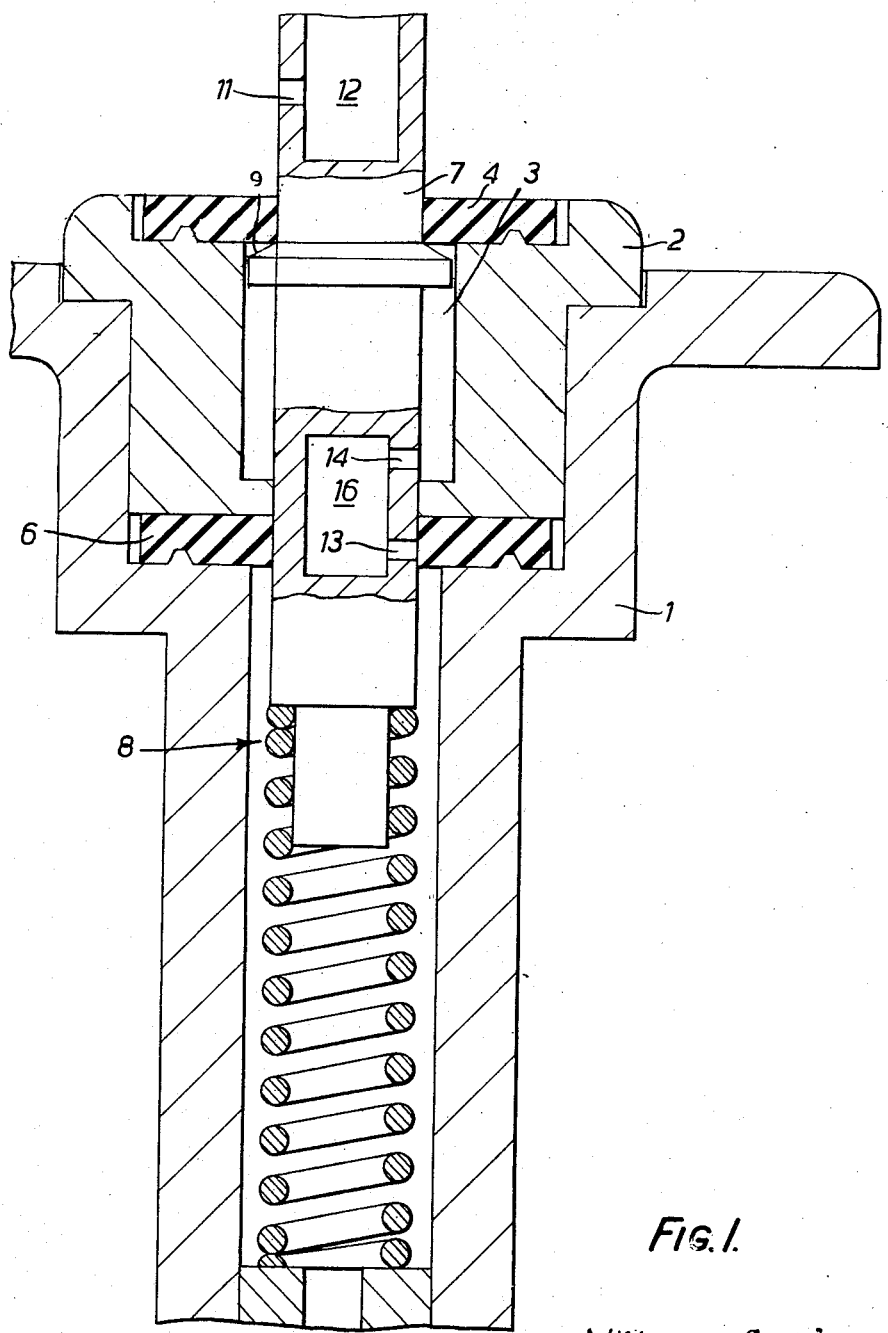
Figure 2:
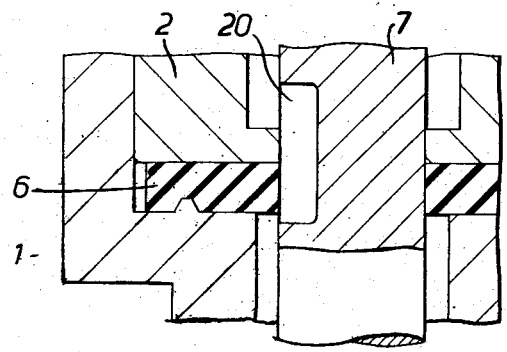
Figure 3:
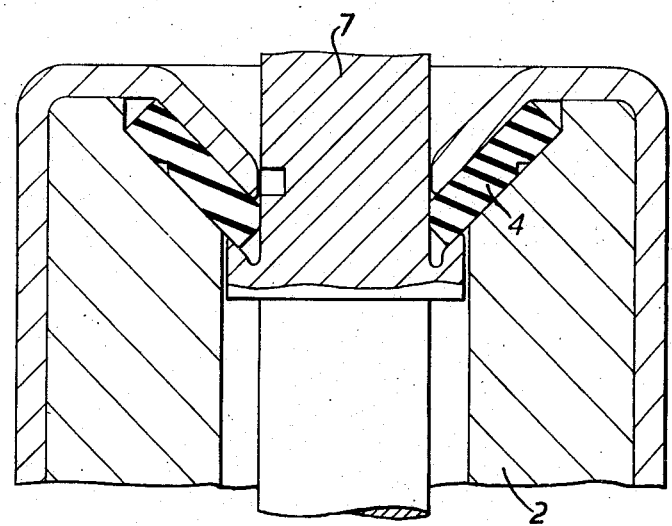

Further features and advantages of the invention will appear from the following description, given by way of example only, of some metering valves in accordance with the invention, which are illustrated in axial cross-section in the accompanying drawings, in which FIGURE 1 shows one valve, FIGURE 2 a part of another, and FIGURE 3 part of a third.

The valves are generally similar in their construction and operation, and corresponding parts of the valves are identified, for convenience, by the same reference numerals in the different figures.

The valve shown in FIGURE 1 comprises a tubular body or cup 1 fitted with a bush 2 defining a metering chamber 3, which is closed at its upper and lower ends by seals 4 and 6, respectively. Extending slidably through both seals is a valve member 7 which is normally held in its upper, illustrated position by a coil compression spring 8, upward movement of the valve member being limited by a conical shoulder 9 making sealing engagement with the upper seal 4.

The valve member is formed with a radial discharge port 11 leading to an axial cavity 12, which leads in known manner to a discharge nozzle in an actuator button (not shown) mounted on the upper end of the valve member.

Also formed in the valve member is a metering passage comprising a pair of spaced radial ports 13 and 14 interconnected through a central cavity 16.

In the illustrated position of the valve, the metering chamber is isolated from the remainder of the interior of the dispenser by the lower seal 6, and from atmosphere by the upper seal 4.

The usual ferrule in which the valve is mounted and by means of which the valve is sealingly secured to the body of the dispenser is omitted from the drawings since it may be conventional in form.

It will be apparent from the drawing, that upon depression of the valve member against its spring 8, the following sequence of events will take place: first, the port 13 will be uncovered below the seal 6 to allow material under pressure to pass into the metering chamber, either to fill it for the first time or replace any part of the dose which may have seeped out following a previous dispensing operation; next the port 14 is covered by the seal 6 to isolate the metering chamber from the rest of the dispenser once more; and finally, the discharge port 11 passes through the upper seal 4 to permit the discharge of material from the metering chamber. On release of the valve member, the above described sequence is reversed, so that the metering chamber is refilled prior to the port 11 becoming open to atmosphere once more.

It should be noted that the seals are equally dimensioned and equally supported at their lower surfaces, so that any variations in flexibility of the seals (due to the material thereof being affected by the pressurized material) will be substantially equal. In particular, the inevitable dishing at the centre of the seals which results from depression of the valve member will be substantially the same at both ends of the metering chamber, whose total effective volume will therefore be largely unaltered throughout the life of the valve.

The valve shown in FIGURE 2 is essentially the same as that of FIGURE 1, except for the arrangement of the metering passage, which in this case is formed by a simple axial slot or recess 20 in the side of the valve member.

In a further modified form, not illustrated, the metering chamber may normally be in communication with the rest of the dispenser, through a single radial port (corresponding to the port 14) communicating with an axial passage extending downwardly through the valve member and open at the lower end thereof.

A further embodiment of the invention is illustrated in FIGURE 3, which shows principally the arrangement of the upper seal 4, other details being omitted for the sake of simplicity. In accordance with another feature of the invention, the seal 4, which in its free shape is substantially flat, is constrained to the part conical form shown in the drawing. The conicity of the seal is selected so as to correspond with the maximum conicity which the seal would assume, in operation of the valve, if it were initially flat but free to dish downwardly.

This inward dishing is a well known phenomenon in aerosol valves and results, in the case of a metering valve, in a certain amount of lost-motion in the operating stroke. It also consumes some dead space in the metering chamber, so that by eliminating the effect, in the manner just described, the minimum dose size which can be delivered by a given valve can be usefully reduced. In addition, the effects of long term variations in the flexibility and hardness of the seal material are eliminated or greatly reduced by pre-determining, in effect, the maximum deflection of the seal.

The arrangement of the bottom seal (not shown in FIGURE 3), may be substantially the same as that of the top seal or it may be in the form of a compressible plug as shown in the specification of British Patent 798,169.

All of the above described forms of the invention have the advantage of relative simplicity of manufacture and of correct assembly. By arranging the spring 8 outside the metering chamber, the minimum dose dispensed can be smaller than would otherwise be possible. The dose can be varied from valve to another merely by alteration of the bush 2. Finally, the valves with similar seals at the top and bottom can be charged by pressure filling techniques without modification of the constructions described.

I claim:
1. An aerosol metering valve for use with a container for pressurized material, comprising a body (1) containing a vertical supply passage adapted for communication at its lower end with the interior of the container, said body being counterbored at its upper end to define a recess the horizontal bottom wall of which defines a first seat;
   an annular first seal (6) supported in said recess on said first seat, said first seal containing a central opening the diameter of which is smaller than the diameter of the supply passage;
   a brush (2) arranged in said recess and having a horizontal lower surface contiguous with the upper surface of said first seal, said bush containing a longitudinal through bore colinear with and of the same diameter as the opening in said first seal, whereby the entire upper surface of the first seal is in supported engagement with the lower surface of the bush, said bush being counterbored at its upper end to define a metering chamber, the free end surface of said bush at said upper end defining a second seat;
   a second annular seal (4) supported on said second seat;
   valve means (7) having cylindrical portions slidably mounted in sealed engagement with said first and second annular seals, respectively, and in the bore in said bush, said valve means being movable downwardly from an inoperative upper position in which the metering chamber is isolated from atmosphere toward an operative lower position in which the metering chamber is isolated from the supply passage in said body and is in communication with atmosphere;
   and resilient means (8) biasing said valve means upwardly toward the inoperative position;
   the diameters of said supply passage and said metering chamber being such relative to the diameters of the openings contained in said first and second seals, respectively, that the dimensions and areas of the surfaces of the seals that are exposed to the material are generally equal, whereby the seals are equally exposed to mechanical stress and the possibility of chemical attack.

2. Apparatus as defined in claim 1, wherein said resilient means is arranged in the supply passage contained in said body.

3. An aerosol metering valve for use with a container for pressurized material, comprising:
   a body containing a longitudinal supply passage adapted for communication at one end with the interior of the container, said body being counterbored at its other end to define a recess the bottom of which defines a first seat;
   annular first seal means supported in said recess on said first seat;
   a bush arranged in said recess and supported at one end on said first seal means, said bush being counterbored at its other end to define a metering chamber, the free end surface of said bush at said other end containing a conical recess defining a conical valve seat;
   annular second seal means supported in an inwardly dished conical condition on said conical valve seat;
   valve means slidably supported by said annular seals and movable between an inoperative position in which the metering chamber is isolated from atmosphere, and an operative position in which the metering chamber is isolated from the supply passage in said body and is in communication with atmosphere;
   and resilient means biasing said valve means toward the inoperative position.

References Cited

UNITED STATES PATENTS

| | | | |
|---|---|---|---|
| 2,777,735 | 1/1957 | Green | 222—402.24 |
| 2,980,301 | 4/1961 | de Gorter | 222—402.2 |
| 3,019,947 | 2/1962 | Gorman | 222—402.2 |
| 3,178,078 | 4/1965 | Wittke | 222—402.2 |
| 3,394,851 | 7/1968 | Gorman | 222—402.2 |

ROBERT B. REEVES, Primary Examiner

FREDERICK R. HANDREN, Assistant Examiner

U.S. Cl. X.R.

222—402.24